United States Patent
Salmi

(10) Patent No.: US 10,556,777 B2
(45) Date of Patent: Feb. 11, 2020

(54) ROPE WHEEL ASSEMBLY, COMPENSATOR AND ELEVATOR ARRANGEMENT

(71) Applicant: KONE Corporation, Helsinki (FI)

(72) Inventor: Markus Salmi, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 16/117,226

(22) Filed: Aug. 30, 2018

(65) Prior Publication Data

US 2019/0106295 A1    Apr. 11, 2019

(30) Foreign Application Priority Data

Oct. 11, 2017  (EP) .................................. 17195926

(51) Int. Cl.
| | | |
|---|---|---|
| *B66B 15/02* | (2006.01) | |
| *F16C 33/66* | (2006.01) | |

(Continued)

(52) U.S. Cl.
CPC ............. *B66B 15/02* (2013.01); *F16C 19/14* (2013.01); *F16C 33/6637* (2013.01); *F16H 57/0471* (2013.01)

(58) Field of Classification Search
CPC .. B66D 3/06; B66D 3/08; B66B 15/02; B66B 15/04
See application file for complete search history.

(56) References Cited

U.S. PATENT DOCUMENTS

| | | | | |
|---|---|---|---|---|
| 1,668,497 A | * | 5/1928 | Fishback .................. | B66D 3/06 254/404 |
| 1,713,586 A | * | 5/1929 | Wright ..................... | B66D 3/06 254/404 |

(Continued)

FOREIGN PATENT DOCUMENTS

| | | |
|---|---|---|
| DE | 20 2015 103 087 U1 | 9/2016 |
| EP | 3 056 461 B1 | 9/2017 |

OTHER PUBLICATIONS

European Search Report of application 17 19 5925 dated Apr. 3, 2018.

*Primary Examiner* — Minh Truong
(74) *Attorney, Agent, or Firm* — Birch, Stewart, Kolasch & Birch, LLP

(57) ABSTRACT

A rope wheel assembly of an elevator includes a frame, a plurality of rope wheels for guiding ropes of the elevator, and a plurality of bearings. The rope wheels are mounted coaxially on the frame such that they are rotatable relative to the frame as well as relative to each other. The rope wheel assembly includes a central shaft passing through the rope wheels, which central shaft is non-rotatable relative to the frame, and the rope wheel assembly includes a hollow cylinder surrounding the central shaft, the hollow cylinder being mounted on the central shaft rotatably relative to the central shaft, each said rope wheel being mounted on the cylinder rotatably relative to the cylinder. The rope wheel assembly includes a bearing axially between rope wheels that are next to each other via which bearing they are supported on each other in axial direction. A compensator and an elevator arrangement implementing the rope wheel assembly are also disclosed.

20 Claims, 3 Drawing Sheets

(51) Int. Cl.
*F16H 57/04* (2010.01)
*F16C 19/14* (2006.01)

(56) References Cited

U.S. PATENT DOCUMENTS

| | | | | |
|---|---|---|---|---|
| 2,459,290 | A | * | 1/1949 | Rozner .................... B66D 3/06 254/404 |
| 3,332,665 | A | | 7/1967 | Bruns |
| 4,074,892 | A | | 2/1978 | Harken |
| 4,240,614 | A | * | 12/1980 | Comer, Jr. ............... B66D 3/06 254/393 |
| 2016/0236909 | A1 | * | 8/2016 | Lampinen ............... B66B 15/04 |

* cited by examiner

ROPE WHEEL ASSEMBLY, COMPENSATOR AND ELEVATOR ARRANGEMENT

FIELD OF THE INVENTION

The invention relates to guiding of ropes of an elevator by aid of rope wheels, the elevator being an elevator for transporting passengers and/or goods.

BACKGROUND OF THE INVENTION

An elevator typically comprises an elevator car and a counterweight, which are vertically movable in a hoistway. These elevator units are typically interconnected by ropes (later referred to as upper ropes) that suspend these elevator units on opposite sides of one or more rope wheels mounted higher than the elevator units. For providing force for moving the suspension ropes, and thereby also for the elevator units, one of the wheels is typically a drive wheel engaging the upper ropes. In addition to the upper ropes, the elevator may need to be interconnected by ropes which hang from the elevator car and the counterweight, and pass around rope wheels of a device (often referred to as a compensator) mounted at a stationary location which is lower than the elevator car and counterweight. This type of ropes (later referred to as lower ropes) are often used to provide compensation for the weight of the hoisting ropes. Particularly, in this way the unbalance, which is caused by the upper ropes in situations where the elevator car is run to its extreme position, can be eliminated. However, these ropes may alternatively or additionally be used to provide so called tie-down function for the elevator. The upper ropes and/or the lower ropes may be round in cross-section or belt-like.

In prior art document EP3056461B1 problems related to tension differences between successive parts of an individual rope as well as unequal rope tension between adjacent ropes have been recognized and solved. The problems have been noticed to be particularly likely when the ropes are belt-like and each of them passes along a cambered shape of a rope wheel. In the aforementioned prior art document a solution to such problems has been provided by aid of a rope assembly where the rope wheels are mounted coaxially on the frame via bearings such that they are rotatable relative to the frame as well as relative to each other, wherein the rope wheels share a central shaft which is non-rotatable relative to the frame. A hollow cylinder surrounds the central shaft, and there are bearings radially between the shaft and the cylinder, as well as radially between each of the rope wheels and the cylinder. The cylinder can rotate around the shaft, and the bearings between the cylinder and the rope wheels provide that the rope wheels need not rotate with exactly the same rotational speeds. A drawback of the presented kind of solution is that it is sensitive to obstructions of free rotation between the rope wheels. It has come up a need for an improved solution in this respect.

BRIEF DESCRIPTION OF THE INVENTION

The object of the invention is to provide a solution for guiding ropes of an elevator, which is improved in terms of freedom of relative rotation between rope wheels of a rope wheel assembly. An object is particularly to alleviate one or more of the above defined problems of prior art and/or problems discussed or implied elsewhere in the description. It is brought forward such embodiments, inter alia, which provide a solution suitable for alleviating problems related to guidance of belt-shaped ropes of an elevator.

It is brought forward a new rope wheel assembly of an elevator, comprising a frame for being mounted on a structure of an elevator arrangement, a plurality of rope wheels for guiding ropes of the elevator, and plurality of bearings, wherein the rope wheels are mounted coaxially on the frame such that they are rotatable relative to the frame as well as relative to each other; and the rope wheel assembly comprises a central shaft passing through said rope wheels, which central shaft is non-rotatable relative to the frame, and the rope wheel assembly comprises a hollow cylinder surrounding the central shaft, the hollow cylinder being mounted on the central shaft rotatably relative to the central shaft, each said rope wheel being mounted on the cylinder rotatably relative to the cylinder. The rope wheel assembly comprises a bearing axially (i.e. in axial direction of the rope wheels) between rope wheels that are next to each other via which bearing they are supported, in particular rotatably, on each other in axial direction of the rope wheels. With this rope wheel assembly, one or more of the above mentioned advantages and/or objectives are achieved. Particularly, by this solution long lasting good rotatability of the rope wheels relative to each other can be facilitated. Particularly, their relative axial position can be controlled such that they are not compressed against each other, whereby it is made possible that their subsequent stucking or jamming or abrasion against each other can be prevented. Preferable further features are introduced in the following, which further features can be combined with the rope wheel assembly individually or in any combination.

In a preferred embodiment, the rope wheel assembly comprises at least one bearing radially between the shaft and the cylinder. Each of said at least one bearing is preferably a rolling element bearing, such as a ball bearing, for example.

In a preferred embodiment, the rope wheel assembly comprises at least one bearing radially between each of the rope wheels and the cylinder. Each of said at least one bearing is preferably a sliding contact bearing.

In a preferred embodiment, each rope wheel is mounted on the cylinder rotatably independently of rotation of any other rope wheels of the rope wheel assembly via said bearing radially between it and the cylinder.

In a preferred embodiment, the hollow cylinder passes through the rope wheels.

In a preferred embodiment, the wall of the hollow cylinder is radially between the rope wheels and the central shaft.

In a preferred embodiment, the rope wheel assembly comprises more than two rope wheels mounted coaxially on the frame, including at least one rope wheel, also hereinafter referred to as an intermediate rope wheel, which intermediate rope is disposed in axial direction between two rope wheels and the rope wheel assembly comprises a bearing axially between said intermediate rope wheel and each of the two rope wheels between which it is disposed. Via these bearings the intermediate rope wheel is supported on the two rope wheels between which it is disposed. Preferably, the rope wheel assembly moreover comprises gap formed in axial direction between said intermediate rope wheel and each of the two rope wheels between which it is disposed, and an annular seal in each of these gaps for blocking substances passing in the gap in radial direction.

In a preferred embodiment, the rope wheel assembly comprises gap formed in axial direction between rope wheels that are next to each other, and an annular seal in the gap for blocking substances passing in the gap in radial direction. Said substances preferably comprise one or more of lubrication, dirt and water. Preferable further features related to the seal are also introduced and described in the following, which further details can be combined with the rope wheel assembly individually or in any combination.

In a preferred embodiment, the seal fills the gap tightly in axial direction of the rope wheel assembly.

In a preferred embodiment, the seal is elastic.

In a preferred embodiment, the seal is made of rubber.

In a preferred embodiment, the rope wheels next to each other comprise annular seal grooves on their axial sides facing each other, and the axial sides of the seal extend into the annular seal grooves of the rope wheels next to each other.

In a preferred embodiment, the seal comprises a first part leaning against one of the rope wheels next to each other, in particular against an inner side of an annular groove thereof, and a second part leaning against the other of the rope wheels next to each other, in particular against an inner side of an annular groove thereof.

In a preferred embodiment, the annular seal is concentric with the shaft, the cylinder, and the rope wheels that are next to each other.

In a preferred embodiment, the annular seal surrounds the shaft, the cylinder and the bearing that is axially between rope wheels that are next to each other.

In a preferred embodiment, the annular seal is rotationally symmetrical.

In a preferred embodiment, the seal is positioned in radial direction on the outer side of the bearing.

In a preferred embodiment, the seal is positioned in radial direction on the outer side of the bearing and closer to the bearing) than the outer rim of the rope wheels that are next to each other.

In a preferred embodiment, the seal is positioned in radial direction on the outer side of the bearing and at a distance (in radial direction) from the bearing, which distance is less than 5 cm, preferably less than 3 cm.

In a preferred embodiment, the rope wheel assembly comprises lubricant on the inner radial side of the seal.

In a preferred embodiment, the rope wheel assembly comprises lubricant in the gap between the bearing and the seal.

In a preferred embodiment, the rope wheel assembly comprises lubricant arranged to lubricate the aforementioned bearing that is axially between rope wheels that are next to each other. It may additionally or alternatively be arranged to lubricate at least one of at least one bearing radially between the rope wheels next to each other and the cylinder.

In a preferred embodiment, the seal is arranged to block (or at least suitable for blocking) lubricant from passing radially outwards in the gap.

In a preferred embodiment, the seal is arranged to block (or at least suitable for blocking) dirt and/or water from passing radially inwards in the gap (i.e. to inner side of the seal. It has been noticed that rotatability of the bearing between rope wheels next to each other is vulnerable to deterioration in the course of time if dirt and/or water get access to the bearing and/or its grease. The seal can provide protection for the rope wheel assembly against this kind of deterioration.

In a preferred embodiment, the lubricant is grease.

In a preferred embodiment, the bearing that is axially between rope wheels that are next to each other is a rolling element bearing, comprising plurality of rolling elements. The rolling elements are preferably, although not necessarily, balls. Preferable further features related to the bearing are also introduced and described in the following, which further details can be combined with the rope wheel assembly individually or in any combination.

In a preferred embodiment, the rolling elements are arranged between rope wheels next to each other in a circular array surrounding the cylinder.

In a preferred embodiment, the diameter of the circular array is more than 15 times the diameter of the rolling bearing elements. In this kind of case, the bearing takes little space. It can even be embedded in the rope wheels compactly, and nevertheless the rope wheel structure is maintained sound, and with small amount of machining.

In a preferred embodiment, the rope wheels next to each other comprise annular bearing grooves on their axial sides facing each other in which annular grooves the rolling elements are placed, in direct contact with the annular grooves.

In a preferred embodiment, each of said annular grooves has a round concave face for supporting a rolling bearing element in the form of a ball.

In a preferred embodiment, the rope wheel assembly comprises a lubrication space on the inner side of the circular array of rolling bearing elements, the lubrication space containing lubricant for lubricating the rolling bearing elements of the circular array of rolling bearing elements. Preferably, this lubrication space is annular.

In a preferred embodiment, each of the rope wheels next to each other comprise a rope wheel body, and said annular seal grooves and/or said annular bearing grooves are delimited by the body. In the latter case, the rope wheels form the races of the rolling element bearing. Each of the grooves can be made by machining into the body or molding them together with the rest of the body, for example. Preferable further features related to the rope wheel structure are also introduced and described in the following, which further details can be combined with the rope wheel assembly individually or in any combination.

In a preferred embodiment, the body comprises a hub, and said annular seal grooves and/or said annular bearing grooves are formed in the hub.

In a preferred embodiment, the body comprises a hub, a rim portion and spokes connecting the hub with the rim portion.

In a preferred embodiment, the body is made of plastic.

In a preferred embodiment, the body forms the outer rim of the rope wheel against which the rope rests.

In a preferred embodiment, the rope wheel assembly comprises an adjusting means mounted on the cylinder for adjusting axial position of the rope wheels relative to the cylinder. For facilitating this adjustment, the rope wheels are preferably mounted slidably in axial direction. Therefore, when operated, said adjusting means are arranged to move the rope wheels by sliding in axial direction. For actuating the sliding, the rope wheel assembly preferably comprises a screw means screwable to move the rope wheels by sliding in axial direction. The slidability is preferably implemented particularly such that the rope wheels and each of the aforementioned at least one bearing radially between each of the rope wheels 4 and the cylinder are slidable together along the cylinder in axial direction In a preferred embodiment, the screw means comprise a first screw on one axial side of all the rope wheels and a second screw on the other (opposite) axial side of all the rope wheels.

In a preferred embodiment, the rope wheels are not fixed to each other and each rope wheel can rotate on the frame independently of rotation of any other rope wheel of the rope wheel assembly.

In a preferred embodiment, the aforementioned rope wheels mounted coaxially on the frame are non-driven rope wheels.

It is also brought forward a new compensator of an elevator, comprising a rope wheel assembly as defined anywhere above. The compensator is preferably mounted on a stationary structure of the elevator, preferably on the floor of the hoistway. Preferable further features related to the compensator are also introduced and described in the following, which further details can be combined with the compensator individually or in any combination.

In a preferred embodiment, the compensator comprises a pedestal mounted immovably on the floor of the hoistway, and the frame of the rope wheel assembly is mounted on the pedestal. The rope wheel assembly is preferably mounted vertically movably on said pedestal. The range of movement of the rope wheel assembly is then limited, preferably to be less than 1.5 meter. The compensator preferably comprises tension weights mounted on the frame of the rope wheel assembly to be supported by it, which tension weights preferably weigh more than 10 kg, more preferably more than 50 kg.

It is also brought forward a new arrangement for guiding ropes of an elevator comprising a plurality of ropes and a rope wheel assembly or a compensator as defined anywhere above. With this arrangement, one or more of the above mentioned advantages and/or objectives are achieved.

In a preferred embodiment, only one rope passes around each of said rope wheels of the rope wheel assembly.

In a preferred embodiment, the rope wheels are cambered and the ropes are belt-shaped ropes. The belt-shaped ropes are then preferably such that they comprise each one or plurality of load bearing members adjacent in width direction of the rope for bearing the load exerted on the rope in longitudinal direction thereof, which load bearing member(s) is/are embedded in a coating forming the surface of the rope, which surface rests against the cambered outer rim of a rope wheel. Preferably, said coating is made of polymer material, such as polyurethane, whereby good protection as well as high friction is provided for the rope. In this context, the tension equalizing of the rope wheel pack is particularly advantageous since with this kind of rope sliding between the rope wheel and the rope is not likely and often not possible and thereby with some of the ropes on one side of the rope wheel the rope tension might be drop dangerously low due to resistance of the other rope wheels for equalizing the tension.

In a preferred embodiment, said ropes hang from the elevator car and a counterweight and said rope wheel assembly is mounted lower than the elevator car and counterweight. Guidance with the assembly as presented is particularly advantageous in this context, because with the hanging ropes, the rope tension may get low, and thereby the above mentioned tension issues are most clearly problematic in this context. Preferably, each of said ropes forms a U-shaped loop hanging from the car and counterweight inside which loop one of said rope wheels of the rope wheel assembly is located. Alternatively, said ropes suspend the elevator car and counterweight on opposite sides of the rope wheels of the rope wheel assembly and said rope wheel assembly is mounted higher than the car and counterweight. However, it is of course also possible that a rope wheel assembly as disclosed is used for guiding both the upper and lower ropes of the elevator.

In a preferred embodiment, the elevator arrangement comprises a hoistway, and an elevator car and a counterweight, which are vertically movable in the hoistway.

Said elevator is preferably an elevator for transporting passengers and/or goods. For this purpose, the elevator comprises a car that has an interior space suitable for receiving a passenger or passengers and/or load to be lifted. The elevator is preferably such that the car thereof is arranged to serve two or more landings. The elevator preferably controls movement of the car in response to calls from landing and/or destination commands from inside the car so as to serve persons on the landing(s) and/or inside the elevator car.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
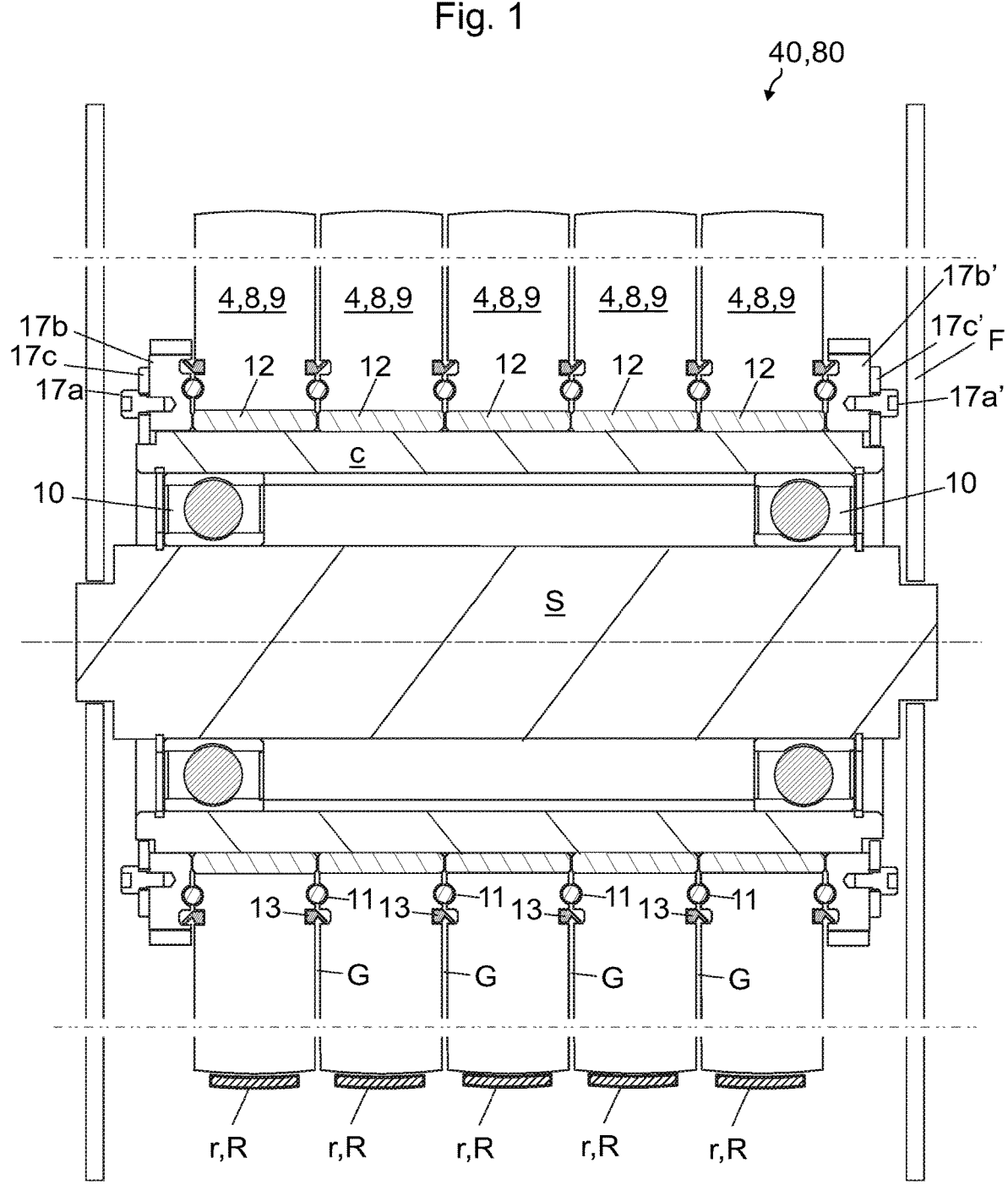
FIG. 1 illustrates a preferred embodiment of a rope wheel assembly.

FIG. 1 illustrates a preferred embodiment of a rope wheel assembly 40,80 of an elevator according to the invention. The rope wheel assembly 40,80 comprises a frame F for being mounted on a structure of an elevator arrangement, a plurality of rope wheels 4,8,9 for guiding ropes of the elevator, and plurality of bearings 10-12, wherein the rope wheels 4,8,9 are mounted coaxially on the frame F via the bearings 10-12 such that they are rotatable relative to the frame F as well as relative to each other. The rope wheels 4,8,9 are non-driven rope wheels.

The rope wheel assembly 40,80 comprises a central shaft S passing through said rope wheels 4,8,9. The central shaft S is non-rotatable relative to the frame F, and the rope wheel assembly 40,80 comprises a hollow cylinder c surrounding the central shaft S, the hollow cylinder c being mounted on the central shaft S rotatably relative to the central shaft S. Thus, the rope wheels through which it passes can rotate together with the cylinder c. The wall of the hollow cylinder c is radially between the rope wheels 4,8,9 and the central shaft S. The hollow cylinder c passes through the rope wheels The rope wheel assembly 40,80, in particular said plurality of bearings 10-12 thereof, comprises at least one bearing 10 radially between the shaft S and the cylinder c. Said at least one bearing 10 facilitates rotation of the cylinder c relative to the shaft S.

Each said rope wheel 4,8,9 is mounted on the cylinder c rotatably relative to the cylinder c. Thus, the rotation speed of the rope wheels can differ from the rotation speed of the cylinder c. In the preferred embodiment, the rope wheel assembly 40,80 comprises at least one bearing 12 radially between each of the rope wheels 4,8,9 and the cylinder c.

The rope wheel assembly 40,80 comprises a bearing 11 in axial direction of the rope wheels 4,8,9 between rope wheels 4,8,9 that are next to each other. Via the bearing 11 these rope wheels 4,8,9 that are next to each other are supported on each other in axial direction of the rope wheels 4,8,9. Hereby, their axial position relative to each other can be controlled such that they are not compressed too closely and strongfully against each other, whereby it is made possible that their stucking or jamming or abrasion against each other can be prevented.

The aforementioned plurality of rope wheels 4,8,9 can comprise 2 or more rope wheels mounted coaxially on the frame F, such as 2-20 rope wheels mounted coaxially on the frame F. In the preferred embodiment, the plurality of coaxially mounted rope wheels 4,8,9 comprises more than 2 rope wheels mounted coaxially on the frame F, including a rope wheel 4,8,9, also hereinafter referred to as an intermediate rope wheel, which intermediate rope is disposed in axial direction between two rope wheels 4,8,9, and the rope wheel assembly 40,80 comprises a bearing 11 as defined axially between said intermediate rope wheel and each of the two rope wheels 4,8,9 between which it is disposed. Via these bearings 11 the intermediate rope wheel 4,8,9 is supported on the two rope wheels 4,8,9 between which it is disposed.

Said at least one bearing 10 radially between the shaft S and the cylinder c is preferably a rolling element bearing. This makes it possible that it is simple to make suitable for high rpm and the bearing 12 between each of the other rope wheels and the cylinder c, as well the bearing 11 axially between rope wheels 4,8,9 that are next to each other, can be made suitable for low rpm conditions, such as a sliding contact bearing or a small radius rolling element bearing. The relative rotation between the rope wheels 4,8,9 is most likely low speed rotation, whereas the relative rotation between all the rope wheels 4,8,9 and the shaft S during movement of the elevator car is high speed rotation.

In the preferred embodiment, the rope wheel assembly 40,80 moreover comprises gap G formed in axial direction between said intermediate rope wheel and each of the two rope wheels 4,8,9 between which it is disposed, and an annular seal 13 in each of these gaps G for blocking substances passing in the gap G in radial direction.

In the preferred embodiment, the rope wheel assembly 40,80 comprises five rope wheels 4,8,9 mounted coaxially on the frame F, but the number could be also greater or smaller. In the preferred embodiment, the rope wheel assembly 40,80 comprises more than three rope wheels mounted coaxially on the frame F and more than one of said intermediate rope wheels.

Figure 2:
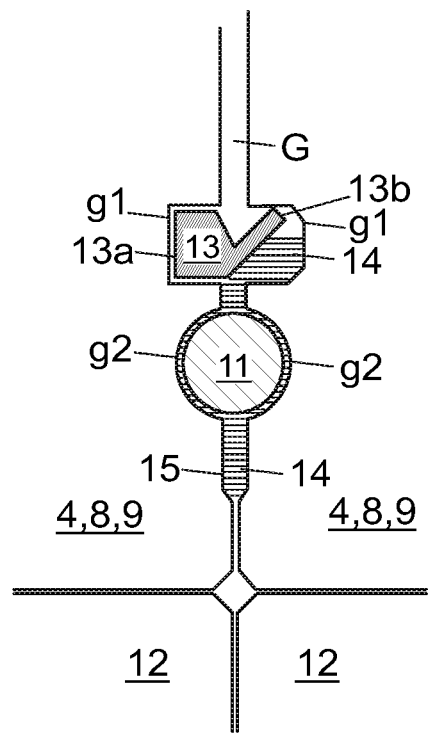
FIG. 2 illustrates preferred details of a bearing of FIG. 1 as well as its surroundings.

In the preferred embodiment of FIG. 1, the rope wheel assembly 40,80 comprises gap G formed in axial direction between rope wheels 4,8,9 that are next to each other, and an annular seal 13 in the gap G for blocking substances passing in the gap G in radial direction. The seal 13 preferably fills the gap G tightly in axial direction of the rope wheel assembly 40,80. FIG. 2 illustrates preferred details of the seal 13 as well as its surroundings.

In the preferred embodiment of FIG. 1, the annular seal 13 is concentric with the shaft S, the cylinder c, and the rope wheels 4,8,9 that are next to each other. The annular seal 13 surrounds the shaft S, the cylinder c and the bearing 11. Thus, it is suitable for blocking substances passing in the gap G in radial direction towards and/or away from said components of the rope wheel assembly 40,80. Said substances can in principle comprise one or more of lubrication, dirt and water, for instance. In the preferred embodiment, the seal 13 is arranged to block lubricant 14 from passing radially outwards in the gap G, i.e. to the outer side of the seal 13, as well as to block dirt and/or water from passing radially inwards in the gap G, i.e. to inner side of the seal 13. Thus, the lubrication is kept on inner side of the seal 13 and the dirt and/or water is/are kept on the outer side of the seal 13.

Structurally, it is preferable that the annular seal 13 is rotationally symmetrical, whereby it is simple to manufacture, and also it can be nested in the gap G simply.

In general, the seal 13 is preferably disposed radially on the outer side of the bearing 11. The seal 13 is moreover preferably positioned in radial direction closer to the bearing 11 than to the outer rim of the rope wheels 4,8,9 that are next to each other. This provides that the speed of the relative rotation between the rope wheels and the seal 13 is low when relative rotation occurs between the rope wheels 4,8,9 that are next to each other. Moreover, thus it can keep the lubrication (optional) close to the bearing 11 preventing the bearing from being left dry of lubrication as a result of centrifugal forces. Preferably, the seal 13 radially on the outer side of the bearing 11 is positioned in radial direction at a distance from the bearing 11, which distance is less than 5 cm, preferably less than 3 cm. In the preferred embodiment illustrated, the rope wheel assembly 40,80 comprises lubricant 14 in the gap G between the bearing 11 and the seal 13. This provides that lubricant cannot easily move radially away from the bearing 11, e.g. due to centrifugal forces.

In the preferred embodiment presented in FIG. 2, the rope wheel assembly 40,80 comprises lubricant 14 on the inner radial side of the seal 13. The lubricant 14 is most preferably grease. The lubricant 14 is arranged to lubricate the aforementioned bearing 11. It is possible to arrange the lubrication to lubricate also the bearings 12 that are between the cylinder c and the rope wheels 4,8,9 that are next to each other. However, this is optional.

The seal 13 is preferably elastic, whereby it can be fitted to lean tightly against the surfaces on opposite sides of the gap G. Most preferably, the seal 13 is made of rubber.

In the preferred embodiment of FIGS. 1 and 2, the rope wheels 4,8,9 next to each other comprise annular seal grooves g1 on their axial sides facing each other, and the axial sides of the seal 13 extend into the annular seal grooves g1 of the rope wheels 4,8,9 next to each other. In particular, the seal 13 comprises a first part leaning 13a against one of the rope wheels 4,8,9 next to each other (the left one in FIG. 2), in particular against an inner side of an annular seal groove g1 thereof, and a second part 13b leaning against the other (the right one in FIG. 2) of the rope wheels 4,8,9 next to each other, in particular against an inner side of an annular seal groove g1 thereof.

The preferred details of the bearing 11 are described hereinafter. In the preferred embodiments presented in FIGS. 1 and 2, the bearing 11 is a rolling element bearing, comprising plurality of rolling elements 11. The rolling elements are preferably balls, as showed in FIGS. 1 and 2.

In the preferred embodiments presented in FIGS. 1 and 2, the rolling elements are arranged between rope wheels 4,8,9 next to each other in a circular array, which circular array surrounds the cylinder c.

The rope wheels 4,8,9 next to each other comprise annular bearing grooves g2 on their axial sides facing each other in which annular grooves g2 the rolling elements 11 are placed, in direct contact with the annular grooves.

In the case, when the rolling elements 11 are balls, each of said annular bearing grooves g2 has a round concave face for supporting a rolling bearing element 11 in the form of a ball.

Preferably, the diameter of the circular array is more than 15 times the diameter of the rolling bearing elements. Then, the bearing 11 can be placed to be embedded in the rope wheels 4,8,9 next to each other compactly, nevertheless maintaining the rope wheel structure sound, and with small amount of machining.

In the preferred embodiments presented in FIGS. 1 and 2, the rope wheel assembly 40,80 moreover comprises a lubricant space 15 on the inner side of the circular array of rolling bearing elements 11, the lubrication space 15 containing lubricant 14. The lubricant space 15 facilitates ensuring that the bearing 11 stays lubricated even if lubricant 14 is pulled radially by centrifugal forces. This lubricant space 15 is however optional. This lubricant space 15 is preferably wider in axial direction than the thinnest portions of the gap G. It is moreover preferably annular.

Preferred details of the rope wheels 4,8,9 are described hereinafter referring to FIGS. 1-3. Each of the rope wheels comprises a rope wheel body b, and said annular seal grooves g1 and/or said annular bearing grooves g2 are delimited by the body b. Thereby, the rope wheel bodies b form the races of the rolling bearing 11. Preferably, the annular seal grooves g1 and/or said annular bearing grooves g2 have been made by machining into the body or molding them together with the rest of the body b.

Figure 3:
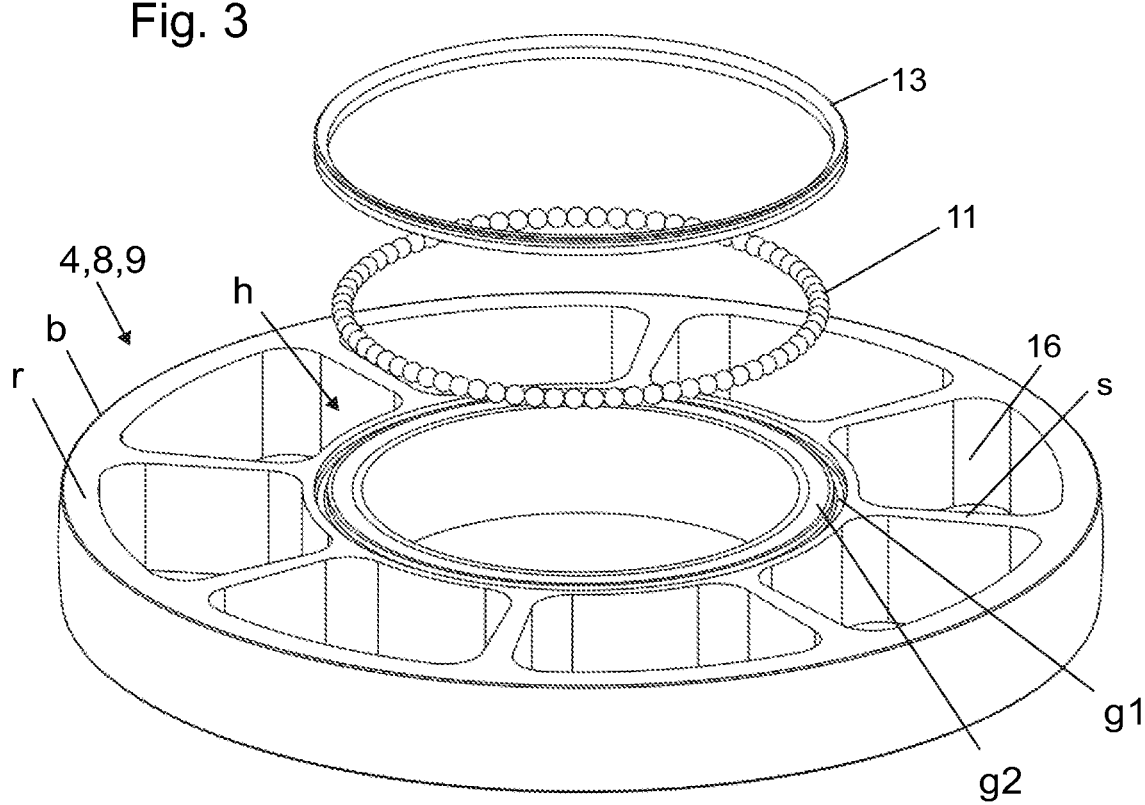
FIG. 3 illustrates preferred details of a rope wheel of the rope wheel assembly of FIG. 1, as well as a bearing and a seal thereof.

As illustrated in FIG. 3, the body b preferably comprises a hub h, and said annular seal grooves g1 and/or said annular bearing grooves g2 are formed in the hub h. Thus, they are positioned within the portion where the circumferential speed is low and moreover where a continuous circular portion is simple to make. The body forms the outer rim of the rope wheel against which the rope can rest.

The body b moreover comprises a rim portion r and spokes s connecting the hub h with the rim portion r. The body moreover comprises recesses 16 extending axial direction into the body b, which recesses are preferably through the body b. The recesses 16 reduce material costs and weight of the body b. The body b is preferably made of plastic.

The rope wheel assembly 40,80 preferably, although not necessarily, moreover comprises an adjusting means 17 mounted on the cylinder c for adjusting axial position of the rope wheels 4,8,9 relative to the cylinder c. For facilitating this adjustment, the rope wheels 4,8,9 are preferably mounted slidably in axial direction. Therefore, when operated, said adjusting means are arranged to move the rope wheels 4,8,9 by sliding in axial direction. For actuating the sliding, the rope wheel assembly 40,80 comprises a screw means 17a,17b;17a',17b' screwable to move the rope wheels 4,8,9 by sliding in axial direction.

The slidability is preferably implemented particularly such that the rope wheels 4,8,9 and each of the aforementioned at least one bearing 12 radially between each of the rope wheels 4,8,9 and the cylinder c are slidable together along the cylinder c in axial direction.

In the preferred embodiment of FIG. 1, the screw means 17a,17b;17a',17b' comprises a first screw 17a on one axial side of all the rope wheels 4,8,9, and a second screw 17a' on the other (opposite) axial side of all the rope wheels 4,8,9. The screw means 17a,17b;17a',17b' comprises a first mounting element 17c immovable relative to the cylinder c, on which the first screw 17 is supported, and a second mounting element 17c' immovable relative to the cylinder c, on which the second screw 17' is supported. The first screw 17a and second screw 17b are arranged to move the rope wheels 7,8,9 of the rope wheel assembly 40,80 in axial direction via flange elements 17b; 17'b between which all the rope wheels 7,8,9 of the rope wheel assembly 40,80 are disposed. Between the outermost rope wheels and the flanges 17b; 17'b, a bearing 11 and a seal 13 can be provided in a similar fashion as between rope wheels that are next to each other.

Preferably, although not necessarily, said bearing 12 radially between each rope wheel 4,8,9 and the cylinder c is a sliding contact bearing. Using such a bearing in this particular position is preferable and feasible, because the rotational speed seen by it is not very high, which is due to rotation occurring between the shaft S and the cylinder c. Each sliding contact bearing 12 is here in the form of a bushing surrounding the cylinder c and having an outer rim whereto a rope wheel 4,8,9 is mounted. The bushing can be made of plastic, for example. The sliding can be arranged to occur between the cylinder c and the bushing and/or between the bushing and the rope wheel 4,8,9. Preferably, the rope wheel assembly 40,80 comprises one said bearing 12 per each of the rope wheels 4,8,9 as disclosed in Figure. However, this is not necessary because the rope wheels could share a sliding bearing contrary to what is disclosed in FIG. 1.

Figure 4:
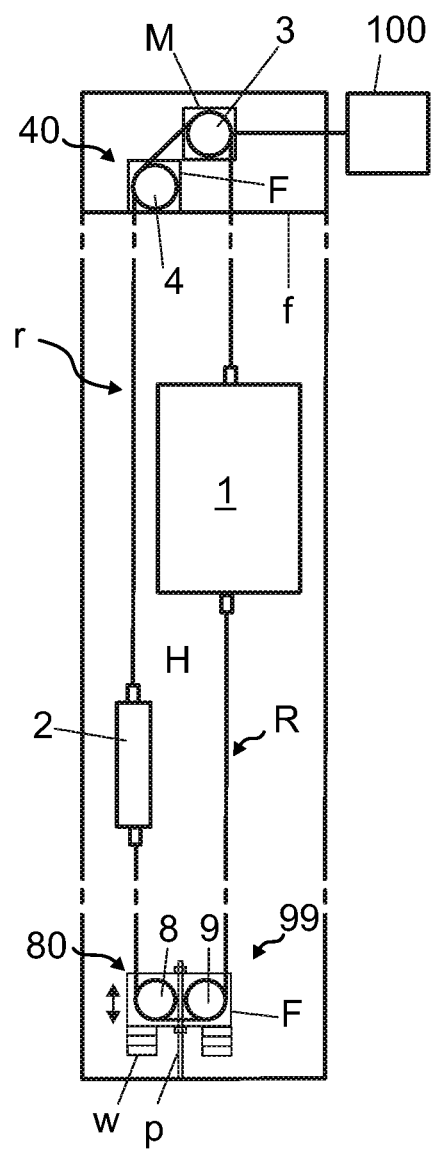
FIG. 4 illustrates a compensator and an arrangement implementing a rope wheel assembly of FIG. 1.

FIG. 4 illustrates an elevator arrangement according to a preferred embodiment. The elevator arrangement comprises a hoistway H, and an elevator car 1 and a counterweight 2, which are vertically movable in the hoistway H. The car 1 and a counterweight 2 are interconnected by ropes r, hereinafter also referred to as upper ropes, suspending the car 1 and the counterweight 2 as well as by ropes R, hereinafter also referred to as lower ropes, which hang from the elevator car 1 and the counterweight 2.

The upper ropes r and/or the lower ropes R can are arranged to be guided by a rope wheel assembly of FIG. 1.

Hereinafter, guidance of the lower ropes R is described in the case where they are guided by a rope wheel 80 assembly as described referring to FIGS. 1-3. The elevator arrangement comprises a rope wheel assembly 80 comprising a frame F mounted on a stationary structure, which is in FIG. 4 the floor of the hoistway H, as well as a plurality of rope wheels 8 for guiding ropes R of the elevator arrangement, which rope wheels 8 are mounted coaxially on the frame F such that they are rotatable relative to the frame F as well as relative to each other. The ropes R pass side by side via the at least one rope wheel assembly 80. The rope wheels 8 are non-driven rope wheels. The rope wheel assembly 80 is as illustrated in FIGS. 1 and 2, and thereby comprises a central shaft S passing through said rope wheels 8, which central shaft S is non-rotatable relative to the frame F, and the rope wheel assembly 40 comprises a hollow cylinder c surrounding the central shaft S, the hollow cylinder c being mounted on the central shaft S rotatably relative to the central shaft S. Each said rope wheel 8 is mounted on the cylinder c rotatably relative to the cylinder c. The rope wheel assembly 80 comprises a bearing 11 axially between rope wheels 8 that are next to each other. The rope wheel assembly 80 is preferably as described referring to FIGS. 1-3.

Preferably, only one rope r,R is arranged to pass around each of said rope wheels 4,8,9 of the rope wheel assembly 40,80. Hereby, each rope wheel can guide a rope rotating on the frame F while being able to turn independently of state of the other rope wheels 4,8,9 of the rope wheel assembly 40,80 in question for equalizing belt tension on opposite sides of each rope wheel.

In FIG. 4, the rope wheel assembly 80 has been illustrated to comprise on the same frame F, additionally plurality of rope wheels 9 mounted coaxially on the frame. Thus, in the presented case, there are two pluralities rope wheels 9 mounted coaxially on the frame F. However, this is not necessary, because the rope wheel assembly 80 does not necessarily need the second plurality. Further rope wheels 9 may not be needed at all, or they could be mounted on another rope wheel assembly.

Hereinafter, guidance of the upper ropes r is described in the case where they are guided by a rope wheel 40 assembly as described referring to FIGS. 1-3. The elevator arrangement comprises a rope wheel assembly 40 comprising a frame F mounted on a stationary structure, which is in FIG. 4 the floor f of the machine room, as well as a plurality of rope wheels 4 for guiding the upper ropes r of the elevator arrangement, which rope wheels 4 are mounted coaxially on the frame F of the assembly 40 such that they are rotatable relative to the frame F as well as relative to each other. The ropes r pass side by side via the at least one rope wheel assembly 40. The rope wheels 4 are non-driven rope wheels. The rope wheel assembly 40 is as illustrated in FIGS. 1 and 2, and thereby comprises a central shaft S passing through said rope wheels 4, which central shaft S is non-rotatable relative to the frame F, and the rope wheel assembly 40 comprises a hollow cylinder c surrounding the central shaft (S), the hollow cylinder c being mounted on the central shaft S rotatably relative to the central shaft S. Each said rope wheel 4 is mounted on the cylinder c rotatably relative to the cylinder c. The rope wheel assembly 40 comprises a bearing 11 axially between rope wheels 4 that are next to each other.

As illustrated, the upper ropes r pass around the rope wheels 4 of the rope wheel assembly 40. In the preferred embodiment, they pass moreover around a drive wheel 3 engaging all said upper ropes r. The drive wheel 3 is provided for moving the upper ropes, and thereby also the car 1 and counterweight 2 interconnected by the upper ropes R. The elevator arrangement preferably also comprises an elevator control 100 for automatically controlling an electric motor M arranged to rotate the drive wheel 3.

FIG. 4 also illustrates an embodiment of a compensator 99 according to the invention. The compensator 99 comprises the rope wheel assembly 80 as described earlier arranged to guide the lower ropes R of the elevator. The compensator 99 comprises a pedestal p mounted immovably on the floor of the hoistway 1, and the frame F of the rope wheel assembly 80 is mounted on the pedestal. The rope wheel assembly 80 is preferably mounted vertically movably on said pedestal p as illustrated by the arrow in FIG. 4. Thus, the compensator 99 can serve for maintaining adequate rope tension in changing car load situations. For this purpose, the compensator 99 preferably comprises tension weights w, preferably weighing more than 10 kg, more preferably more than 50 kg. The range of movement of the rope wheel assembly 80 is limited, preferably to be less than 1.5 meter. The pedestal preferably comprises a vertical guide rail for guiding movement of the rope wheel assembly 80. In FIG. 4, the vertically elongated element illustrates such a guide rail. As also illustrated in FIG. 4, the rope wheel assembly preferably comprises one or more guide members that can slide or roll vertically along the guide rail.

Preferred details of the ropes r,R and their guidance and axial position control are described hereinafter referring to FIGS. 1 and 4. The ropes r,R are preferably belt-shaped, and thereby substantially larger in width direction than in thickness direction. Each rope wheel 4,8,9 of said rope wheel assembly 40,80 are cambered, whereby the position (in axial direction of the rope wheel) of each rope on the circumference of the rope wheel around which it turns, is controlled. The rope wheel assembly 40,80 comprises a frame F mounted on a structure of an elevator, and as mentioned a plurality of rope wheels 4,8,9 for guiding ropes of the elevator, one for each ropes passing via the rope wheel assembly 40,80. Each rope wheel 4,8,9 is arranged to guide (only) one of the ropes r,R. Each rope wheel assembly 40,80 comprises a plurality of bearings, and the rope wheels 4,8,9 are mounted coaxially on the frame F via the bearings such that they are rotatable relative to the frame F as well as relative to each other. Each rope wheel 4,8,9 is thus rotatable relative to the frame F as well as relative to each and any of the other rope wheels of said rope wheel assembly. The rope wheels 4,8,9 are not fixed to each other so they can rotate relative to each other. Each rope wheel 4,8,9 can rotate on the frame F independently of rotation of any other rope wheels 4,8,9 of the rope wheel assembly 40,80. Each belt-shaped lower rope r passes around only one of said rope wheels 4,8,9 of the rope wheel assembly 40,80. Each cambered rope wheel 4,8,9 has a circumference with a curved convex shaped cross section. A rope r,R is placed to pass its wide side (i.e. the side extending in width direction of the rope) resting against the circumference with the curved convex shaped cross section.

In general, said frame F is preferably such that it comprises a first frame part (face plate on the left in FIG. 1) and a second frame part (face plate on the right in FIG. 1), supporting the shaft S common to all said rope wheels 4,8,9, and the rope wheels 4,8,9 are accommodated between them. The shaft being non-rotatable relative to the frame F, it is preferable that the rope wheel assembly 40,80 comprises a fixing means (not showed) for fixing the shaft non-rotatably to the frame F, for example by means disclosed in European patent application EP2406165 A1.

Preferred details of the internal structure of the ropes r,R is described. The ropes, when belt-shaped, r,R are preferably such that they comprise each one or plurality of load bearing members adjacent in width direction of the rope for bearing the load exerted on the rope in longitudinal direction thereof, which load bearing member(s) is/are embedded in a coating forming the surface of the rope, which surface rests against the cambered circumference of a rope wheel. Preferably, said coating is made of polymer material, such as polyurethane, whereby good protection as well as high friction is provided for the rope. In this context, the tension equalizing of the rope wheel assembly is particularly advantageous as with this kind of rope sliding between the rope wheel and the rope is not possible and thereby with some of the ropes on one side of the rope wheel the rope tension might be drop dangerously low due to resistance of the other rope wheels for equalizing the tension. The ropes have preferably width thickness ratio more than 2, so as to ensure it has an efficient guidance and engagement with the rope wheel, and/or a feasible turning radius. The rope structure can be in accordance with the rope disclosed in international patent application WO2009090299A1, for instance. In this case, the load bearing members of the ropes r,R are made of composite material comprising reinforcing fibers, preferably carbon fibers, embedded in polymer matrix.

In general, it is preferred that the rope wheels 4,8,9 are mounted coaxially on the frame F such that they are freely rotatable. Each rope wheel 4,8,9 can then preferably rotate an unlimited angle and number of revolutions relative to the other rope wheels of the rope wheel assembly as well as the frame F.

In the above, it is mentioned that the ropes r,R are preferably belt-shaped. However, one or more advantages can be achieved irrespective of the structure of the ropes.

Also, in the above, it is mentioned that the ropes r,R are most preferably belt-shaped, and the rope wheels 4,8,9 are cambered, since in this context the invention brings the most advantages. However, one or more advantages can be achieved irrespective of how the axial position of the belt-shaped ropes is controlled. The ropes r, R could be toothed or v-ribbed (e.g. polyvee-ropes) ropes, for instance.

In the above, a preferred solution has been described where the rope wheel assembly 40,80 has only one seal 13 in the gap G for blocking substances passing in the gap G in radial direction. However, it is also possible that the rope wheel assembly 40,80 comprises one or more further seals in the gap G for blocking substances passing in the gap G in radial direction, such as a second seal positioned in radial direction on the outer side of the seal 13 shown in FIGS. 1-3. The second seal is then preferably shaped and mounted in seal grooves similarly as the seal 13, which then serves as a primary seal, the second seal serving as a secondary seal.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A rope wheel assembly of an elevator, comprising:
a frame;
a plurality of rope wheels for guiding ropes of the elevator; and
bearings, wherein the plurality of rope wheels are mounted coaxially on the frame such that the plurality of rope wheels are rotatable relative to the frame as well as relative to each other;
a central shaft passing through said plurality of rope wheels, the central shaft being non-rotatable relative to the frame;
a hollow cylinder surrounding the central shaft, the hollow cylinder being mounted on the central shaft rotatably relative to the central shaft, each of said plurality of rope wheels being mounted on the cylinder rotatably relative to the cylinder, said bearings including at least one radial bearing arranged between the plurality of rope wheel and the cylinder; and
an axial ball bearing in an axial direction between the rope wheels that are next to each other, said rope wheels that are next to each other being supported on each other in the axial direction via said axial bearing,
wherein the rope wheels next to each other comprise annular bearing grooves on axial sides thereof that are facing each other for accommodating the axial bearing, and the axial bearing is positioned radially outward of the radial bearing in its entirety with a radial distance from the radial bearing, and lubricant is contained within said radial distance between the rope wheels next to each other.

2. The rope wheel assembly according to claim 1, wherein the rope wheel assembly comprises gap between the rope wheels that are next to each other, and an annular seal in the gap for blocking substances passing in the gap in a radial direction.

3. The rope wheel assembly according to claim 2, wherein the seal is positioned in the radial direction on an outer side of the axial bearing.

4. The rope wheel assembly according to claim 2, wherein the seal is positioned in the radial direction on an outer side of the axial bearing and closer to the axial bearing than outer rims of the rope wheels that are next to each other.

5. The rope wheel assembly according to claim 2, wherein the rope wheel assembly comprises the lubricant in the radial direction on an inner side of the seal.

6. The rope wheel assembly according to claim 5, wherein the lubricant is arranged to lubricate the axial bearing.

7. The rope wheel assembly according to claim 5, wherein the seal is suitable for blocking the lubricant from passing radially outwards in the gap.

8. The rope wheel assembly according to claim 2, wherein the seal is suitable for blocking dirt and/or water from passing radially inwards in the gap.

9. The rope wheel assembly according to claim 2, wherein the axial sides of the seal extend into annular seal grooves of the rope wheels next to each other.

10. The rope wheel assembly according to claim 9, wherein each of the rope wheels next to each other comprise a rope wheel body, and said annular seal grooves and/or said annular bearing grooves are delimited by the body.

11. The rope wheel assembly according to claim 9, wherein each of the rope wheels next to each other comprise a rope wheel body, and the body comprises a hub, and said annular seal grooves and/or said annular bearing grooves are formed in the hub.

12. The rope wheel assembly according to claim 1, wherein the axial bearing is a rolling element bearing.

13. The rope wheel assembly according to claim 12, wherein the rolling elements are placed in the annular bearing grooves and are in direct contact with the annular bearing grooves.

14. The rope wheel assembly according to claim 12, wherein the rolling elements are arranged between rope wheels next to each other in a circular array surrounding the cylinder, and the diameter of the circular array is more than 15 times the diameter of the rolling bearing elements.

15. The rope wheel assembly according to claim 1, wherein the rope wheel assembly comprises an adjusting means mounted on the cylinder for adjusting axial position of the rope wheels relative to the cylinder.

16. The rope wheel assembly according to claim 1, wherein said at least one radial bearing is a sliding contact bearing.

17. The rope wheel assembly according to claim 1, wherein the rope wheel assembly comprises at least one bearing radially between the shaft and the cylinder, said at least one bearing being a rolling element bearing.

18. A compensator of an elevator, comprising the rope wheel assembly according to claim 1.

19. An arrangement for guiding belt-shaped ropes of an elevator, the arrangement comprising:
a plurality of ropes; and
the compensator according to claim 18.

20. An arrangement for guiding belt-shaped ropes of an elevator, the arrangement comprising:
a plurality of ropes; and
the rope wheel assembly according to claim 1.

* * * * *